March 29, 1932.   A. S. ADAMS   1,851,030
SEWAGE DISPOSAL PLANT
Filed Dec. 9, 1929   2 Sheets-Sheet 1
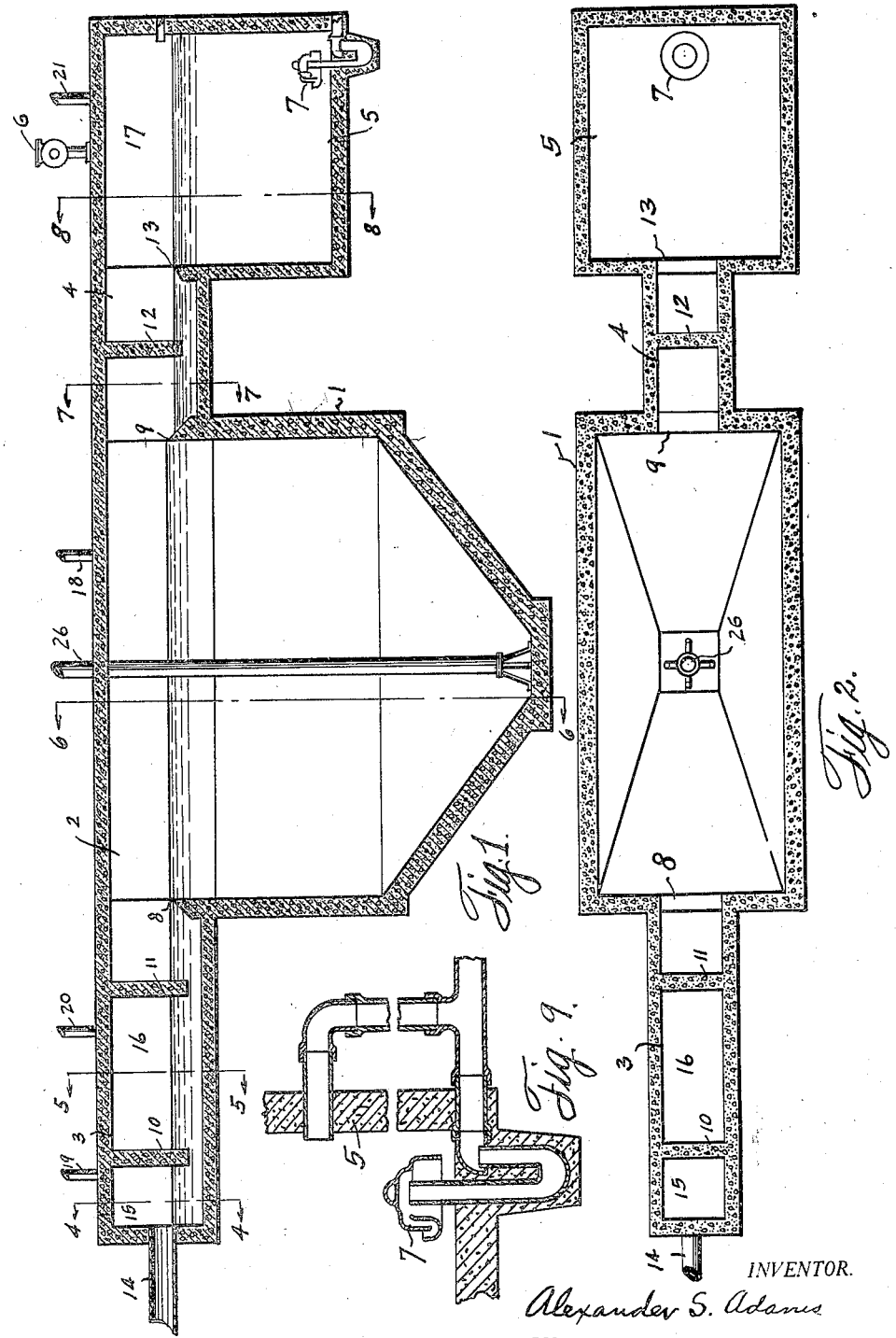
INVENTOR.
Alexander S. Adams
BY
Hardway Cathey
ATTORNEYS.

March 29, 1932. A. S. ADAMS 1,851,030
SEWAGE DISPOSAL PLANT
Filed Dec. 9, 1929 2 Sheets-Sheet 2
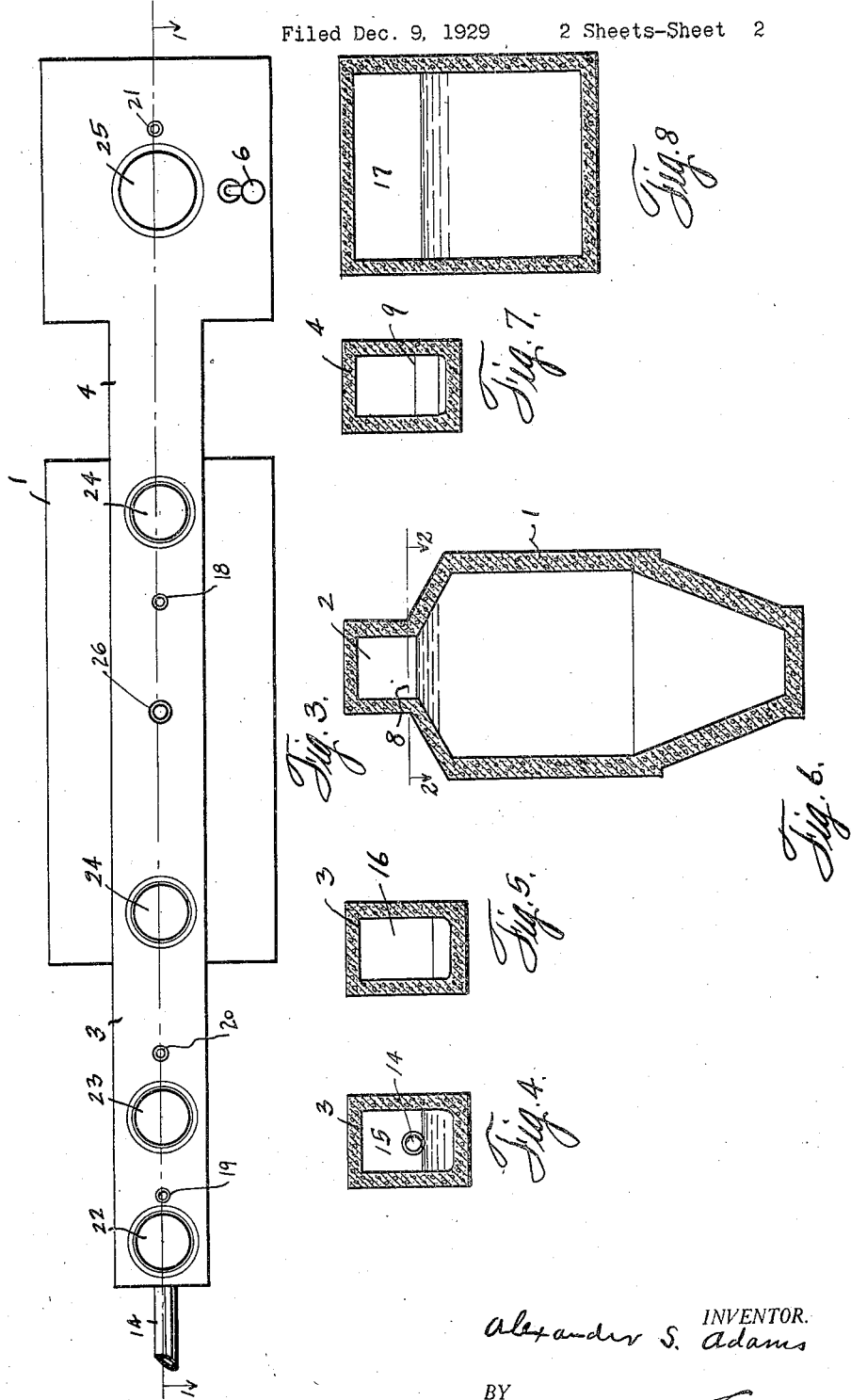
INVENTOR.
Alexander S. Adams
BY
Hardway Cathey
ATTORNEYS.

Patented Mar. 29, 1932

1,851,030

UNITED STATES PATENT OFFICE

ALEXANDER S. ADAMS, OF HOUSTON, TEXAS, ASSIGNOR OF ONE-FIFTH TO W. L. PEARSON, ONE-FIFTH TO H. C. McCALL, ONE-FIFTH TO J. P. MILLER, AND ONE-FIFTH TO L. T. MESSER, ALL OF HARRIS COUNTY, TEXAS

SEWAGE DISPOSAL PLANT

Application filed December 9, 1929. Serial No. 412,785.

This invention relates to new and useful improvements in a sewage disposal plant.

One object of the invention is to provide apparatus for the disposition of sewage whereby all odors arising from the sewage will be confined and prevented from escaping and polluting the surrounding atmosphere. Sewage disposal plants now in common use, in disposing of the sewage, permit, at least a certain amount of the odorous gases arising to escape and befoul the surrounding atmosphere, and this is a very objectionable feature particularly when the plant is located in or adjacent a built up community. It is the prime object of this invention to provide means for sewage disposal whereby the escape of such objectionable gases and odors will be positively prevented.

Another object of the invention is to provide apparatus of the character described wherein sewage may be collected for disposition and the obnoxious gases and odors arising therefrom retained therein, said apparatus being equipped with means for withdrawing the solids, liquid and gases therefrom, separately, for their ultimate disposal.

A further feature of the invention resides in the provision of sewage disposal apparatus which is of simple construction, may be cheaply and easily constructed and which is very efficient in use.

With the above and other objects in view this invention has particular relation to certain novel features of construction, operation and arrangement of parts an example of which is given in this specification and illustrated in the accompanying drawings, wherein:—

Figure 1 shows a longitudinal vertical sectional view of the apparatus, taken on the line 1—1 of Figure 3.

Figure 2 shows a longitudinal, horizontal sectional view thereof, taken on the line 2—2 of Figure 6.

Figure 3 shows a plan view thereof.

Figure 4 shows a vertical sectional view taken on the line 4—4 of Figure 1.

Figure 5 shows a vertical sectional view taken on the line 5—5 of Figure 1.

Figure 6 shows a vertical sectional view taken on the line 6—6 of Figure 1.

Figure 7 shows a vertical sectional view taken on the line 7—7 of Figure 1.

Figure 8 shows a vertical sectional view taken on the line 8—8 of Figure 1, and Figure 9 shows a fragmentary vertical sectional view of the dosing tank showing the discharge siphon.

Referring now more particularly to the drawings, wherein like numerals of reference designate similar parts in each of the figures the numeral 1 designates a settling tank which may be of any desired contour, but which is preferably rectangular in horizontal cross sectional contour and whose bottom has a hopper like shape. The upper portion of the settling tank 1 is preferably reduced in width, on each side, forming a centrally located longitudinal, channel like chamber 2, which may be of any preferred design, but which, as shown, is rectangular in vertical cross section. Extending each way from the respective ends of the chamber 2 are the influent channel 3 and the effluent channel 4 which are completely enclosed and are also preferably rectangular in vertical cross sectional contour. The effluent channel 4 terminates in an enlarged dosing tank 5 which is equipped with an air inlet valve 6 and any preferred type of discharge siphon, as 7. Other means than the siphon 7 may be employed for emptying the tank 5, if preferred.

The influent channel 3 is provided with a weir 8, at the juncture of said channel with the settling tank, provided for maintaining the contents of said channel at the desired level, and there is a similar weir 9 across the effluent channel 4, at its juncture with the settling tank, for maintaining the contents of the settling tank at the desired level.

In the influent channel 3 are the depending spaced baffles, or aprons 10, 11 which span said channel, and depend from the top thereof and whose lower margins are in a horizontal plane beneath the horizontal plane of the top of the weir 8, so that said lower margins will be submerged in the fluid contents of the channel 3.

There is also a depending baffle, or apron, 12 spanning the effluent channel 4 and depending from the top thereof, and located between the weir 9 and the weir 13 which spans said effluent channel at its juncture with the dosing tank. The upper margin of weir 13 is located in a horizontal plane beneath that of the upper margin of the weir 9 and above that of the lower margin of the apron 12 to the end that the lower margin of the apron 12 will always be submerged in the fluid contents of the channel 4. When the fluid in said channel 4, and consequently in the dosing tank 5 also, rises higher than the weir 13 the siphon 7 will begin to operate and will empty said dosing tank. The structure hereinbefore described is preferably formed of cementitious material, is monolithic in structure and is proof against the escape of gases or odors.

There is a sewage inlet line 14 leading into the outer end of the influent channel 3 from the source of supply.

It will be noted from the foregoing that a plurality of gas chambers, or traps, are provided; two in the influent channel, indicated by the numerals 15, 16, the chamber 2 between the aprons 11, 12 and one, indicated by the numeral 17, between the apron 12 and the opposing end of the dosing chamber. These traps are closed, and are isolated from each other by said respective aprons 10, 11, 12 However outlet lines 18, 19, 20, 21 lead from said respective traps 2, 15, 16 and 17 and these lines are suitably controlled and through them the gases collecting in said respective traps may be led off and burned or utilized for motive fuel, or otherwise disposed of.

The traps 15, 16 are provided with conventional, tight, man holes 22, 23 for access thereto, while the trap, or chamber 2, has the transparent windows 24, 24, for inspection, and the trap 17 has a transparent window 25 for a similar purpose. These man holes and windows are preferably in the roof of the structure.

Anchored to said roof and depending down into the settling tank 1 to near the bottom thereof there is a relief tube 26, whose exposed end is sealed, when not in use, and which is provided for the purpose of access to the interior of said tank for pumping out, or otherwise removing, its contents.

The green sewage flowing through the line 14 will first enter the outer end of the influent channel and foreign articles and objects may from time to time be removed through the man hole 22. The sewage will pass successively under the aprons 10, 11 and will pour over the weir 8 into the settling tank. In operation, the level of the contents of this tank will be maintained at approximately the level of the horizontal plane of the upper margins of the weirs 8, 9 and the insoluble portions of the sewage will settle in the settling tank 1 and may be removed, as necessary, through the relief tube 26. As additional sewage flows into the settling tank, when the same is full, the liquid sewage will pour over the weir 9, keeping the free lower margin of the apron 12, submerged, and passing thence over the weir 13 into the dosing tank 5. The contents of the dosing tank is practically clear water, with certain solid particles, invisible to the natural eye, in suspension therein. Said contents will be evacuated intermittently by the siphon 7, or other means provided for the purpose.

The sewage will be disposed of, by the apparatus described, without any appreciable septic action and with substantially no uncontrolled escape of gases or offensive odors.

The drawings and description disclose what is now considered to be the preferred form of the invention, by way of illustration, while the broad principle of the invention will be defined by the appended claims.

What I claim is:

1. A sewage disposal apparatus including a closed settling tank whose upper portion is reduced in width, forming a centrally located longitudinal chamber, a closed influent channel entering said tank, a closed effluent channel leading from said settling tank and terminating in a closed dosing tank, the bottoms of said channels being approximately on a level with the tops of said respective tanks, traps in said channels for trapping the sewage gases therein, and means for relieving said tanks and traps of the contents thereof.

2. A sewage disposal apparatus including a closed settling tank whose upper portion is reduced in width, forming a narrow longitudinal chamber, a closed influent channel and a closed effluent channel therefor, a dosing tank into which said effluent channel discharges, means in said channels for maintaining the fluid flowing through the channels at selected levels therein, depending aprons spanning said channels and whose upper and side margins are adjacent the upper and side walls of said channels and whose lower margins are submerged in said fluid, said aprons forming said channels with separate gas trapping chambers.

3. A sewage disposal apparatus including a closed settling tank whose upper portion is reduced in width forming a longitudinal chamber, a closed influent channel and a closed effluent channel therefor, a dosing tank into which said effluent channel discharges, means in said channels for maintaining the fluid flowing through the channels at selected levels therein and means partly submerged in said fluid and associated with said level maintaining means and arranged to permit the fluid to flow thereunder, only, and forming gas trapping chambers, and means for relieving said tanks and chambers.

4. A sewage disposal apparatus including a closed settling tank whose upper portion is reduced in width forming a longitudinal chamber and a closed dosing tank, an influent channel leading into the settling tank and an effluent channel connecting the settling tank with the dosing tank, a weir across the influent channel an inlet line entering said influent channel, means depending from the top of the influent channel between said weir and said inlet forming gas traps in the influent channel, spaced weirs across the effluent channel and means depending from the top of the effluent channel between said weirs forming gas traps on opposite sides of said last mentioned means.

5. A sewage disposal apparatus including a closed settling tank whose upper portion is reduced in width forming a longitudinal collecting chamber and a closed dosing tank, an influent channel leading into the top of the settling tank and an effluent channel connecting the tops of said tanks, weirs across said channels adjacent the settling tank whose upper margins are on a common level, a weir across the effluent channel adjacent the dosing tank whose upper margin is on a level beneath that of the other weir of said channel, an inlet line entering the outer end of the influent channel, a plurality of depending, spaced, baffles spanning the influent channel and depending from the top thereof and whose lower margins are in a horizontal plane beneath the horizontal planes of the top of the weir of said influent channel, a depending baffle spanning the effluent channel and depending from the top thereof and whose lower margin is in a horizontal plane beneath the plane of the top of the weir adjacent the dosing tank.

In testimony whereof I have signed my name to this specification.

ALEXANDER S. ADAMS.